US012258150B2

(12) United States Patent
Hong et al.

(10) Patent No.: US 12,258,150 B2
(45) Date of Patent: Mar. 25, 2025

(54) DIGITAL FILTER BASED METHOD FOR MEASURING THRUST RESPONSE TIME OF SATELLITE-BORNE MICRO-THRUSTER

(71) Applicant: Aerospace Engineering University of the People's Liberation Army (PLA) Strategic Support Force, Beijing (CN)

(72) Inventors: Yanji Hong, Beijing (CN); Xiaohui Feng, Beijing (CN); Xing Jin, Beijing (CN); Jifei Ye, Beijing (CN); Haichao Cui, Beijing (CN); Gaoping Feng, Beijing (CN)

(73) Assignee: Aerospace Engineering University of the People's Liberation Army (PLA) Strategic Support Force, Beijing (CN)

( * ) Notice: Subject to any disclaimer, the term of this patent is extended or adjusted under 35 U.S.C. 154(b) by 287 days.

(21) Appl. No.: 17/964,466

(22) Filed: Oct. 12, 2022

(65) Prior Publication Data

US 2023/0150696 A1 May 18, 2023

(30) Foreign Application Priority Data

Nov. 16, 2021 (CN) .......................... 202111352455.6

(51) Int. Cl.
*B64G 1/36* (2006.01)
*G06F 17/13* (2006.01)
(52) U.S. Cl.
CPC .............. *B64G 1/36* (2013.01); *G06F 17/13* (2013.01)
(58) Field of Classification Search
CPC ... B64G 1/36; B64G 1/10; B64G 1/26; B64G 1/262; G06F 17/13; G06F 30/20;
(Continued)

(56) References Cited

U.S. PATENT DOCUMENTS 9,115,662 B1 * 8/2015 Claggett ................. F02D 41/22

FOREIGN PATENT DOCUMENTS

CN          108829946 A  * 11/2018  .............. G06F 17/11

OTHER PUBLICATIONS

Polk et al, "Recommended Practices in Thrust Measurements", 2013. (Year: 2013).*

* cited by examiner

*Primary Examiner* — Abby Y Lin
*Assistant Examiner* — Esvinder Singh

(57) ABSTRACT

The present disclosure belongs to the technical field of space satellite propulsion, and particularly relates to a digital filter based method for measuring thrust response time of a satellite-borne micro-thruster. The method for measuring thrust response time in the present disclosure includes the following steps: S1: zeroing non-zero initial conditions of a torsional pendulum thrust measurement system to obtain an oscillating differential equation for a thrust measurement system after variable substitution; S2: connecting the digital filter in series behind the thrust measurement system after variable substitution to obtain an equivalent-sensitivity high-frequency thrust measurement system; S3: determining a system response of the equivalent-sensitivity high-frequency thrust measurement system; S4: determining and reading thrust response time of the satellite-borne micro-thruster from the system response; and S5: computing thrust to be measured by means of the system response inversely, and further confirming the thrust response time.

18 Claims, 7 Drawing Sheets

(58) Field of Classification Search
CPC .. G06F 2119/12; G06F 2119/14; Y02T 90/00; H03H 17/02; G05B 2219/21138; G05B 2219/37344

See application file for complete search history.

DIGITAL FILTER BASED METHOD FOR MEASURING THRUST RESPONSE TIME OF SATELLITE-BORNE MICRO-THRUSTER

CROSS-REFERENCE TO RELATED APPLICATION

This application claims priority from the Chinese patent application 2021113524556 filed Nov. 16, 2022, the content of which are incorporated herein in the entirety by reference.

TECHNICAL FIELD

The present disclosure relates to the technical field of space satellite propulsion, in particular to a digital filter based method for measuring thrust response time of a satellite-borne micro-thruster.

BACKGROUND ART

For precise control over a satellite, thrust of a micro-thruster is required to be rapidly adjusted, and thrust response time is required to be controlled within a specified range. Thrust response time can be represented by thrust increasing time or thrust decreasing time. If thrust is varied from small steady thrust to large steady thrust, thrust response time is represented by thrust increasing time, and if thrust is varied from large steady thrust to small steady thrust, thrust response time is represented by thrust decreasing time. In this way, thrust response time is one of evaluation indexes of a micro-thruster.

Difficulties in measurement of thrust response time are as follows: a thrust varying frequency is far greater than a natural frequency of a thrust measurement system, or a natural frequency of a thrust measurement system is too low to satisfy the requirement of measuring response time of rapid-varying thrust. Firstly, due to high sensitivity requirement of a thrust measurement system for measuring micro-thrust, a stiffness coefficient of the thrust measurement system is extremely small, such that a natural frequency is decreased. Secondly, since a thruster is carried on the thrust measurement system, and the moment of inertia of rotary components (such as a thruster, a counterweight and a structural beam) of the thrust measurement system is extremely large, the natural frequency is also decreased. Finally, if thrust response time at a 10-ms level is to be measured, a natural linear frequency of the thrust measurement system is required to be 100 Hz or above, which is difficult to realize by any (torsional pendulum, hanging pendulum, inverted pendulum and bending vibration) thrust measurement system in physical structure at present.

The main defects of an existing method for measuring thrust response time of a satellite-borne micro-thruster are as follows:

(1) Inherent relations between thrust response time and system responses of a thrust measurement system are not understood. In fact, system responses of the thrust measurement system include a transient system response and a steady-state system response, and only if thrust response time is longer than transient time (or time of entering a steady state) of the thrust measurement system, thrust response time can be reflected from system responses of a thrust measurement system.

(2) A dynamic thrust computation method for response time of rapid-varying thrust is immature, and it is difficult to reflect an accurate thrust increasing process or thrust decreasing process. During dynamic thrust computation, by taking a difference quotient as an approximate value of a derivative to solve an oscillating differential equation inversely (that is, to solve an inverse problem of an oscillating equation), firstly, errors are great: by taking a difference quotient as an approximate value of a derivative, an error of a first-order derivative is extremely great, and an error of a second-order derivative is greater; and secondly, astringency is poor: a truncation error is increased if a step is great, and a round-off error is increased if a step is small.

SUMMARY

In view of this, the objective of the present disclosure is to solve the problem of measuring response time of rapid-varying thrust.

In order to solve the above technical problem, the present disclosure provides a digital filter based method for measuring thrust response time of a satellite-borne micro-thruster. The method includes the following steps:

S1: zeroing non-zero initial conditions of a torsional pendulum thrust measurement system to obtain an oscillating differential equation for a thrust measurement system after variable substitution;

S2: connecting the digital filter in series behind the thrust measurement system after variable substitution to obtain an equivalent-sensitivity high-frequency thrust measurement system;

S3: determining a system response of the equivalent-sensitivity high-frequency thrust measurement system;

S4: determining and reading thrust response time of the satellite-borne micro-thruster from the system response; and S5: computing thrust to be measured by means of an equivalent-sensitivity high-frequency thrust measurement system inversely, and further confirming the thrust response time.

In the step S1, a system response $\theta'(t)$ is measured by a displacement sensor under the action of the thrust $f'(t)$ to be measured, variable substitution is carried out according to the non-zero initial conditions $(\theta_0, \dot{\theta}_0)$, and assuming that $\theta(t)=\theta'(t)-\dot{\theta}_0 t-\theta_0$, $\dot{\theta}(t)=\dot{\theta}'(t)-\dot{\theta}_0$ and $\ddot{\theta}(t)=\ddot{\theta}'(t)$, the oscillating differential equation for the thrust measurement system after variable substitution is obtained:

$$\ddot{\theta}(t) + 2\zeta\omega_n\dot{\theta}(t) + \omega_n^2\theta(t) = \frac{L_f}{J}f(t)$$

$$f(t) = f'(t) + f_0(t)$$

$$f_0(t) = -\frac{J}{L_f}\left(2\zeta\omega_n\dot{\theta}_0 + \omega_n^2\dot{\theta}_0 t + \omega_n^2\theta_0\right)$$

where $f_0(t)$ represents equivalent thrust related to the non-zero initial conditions, $f'(t)$ represents the thrust to be measured, $\theta'(t)$ represents the system response measured by the displacement sensor under the action of the thrust, $\zeta$ represents a damping ratio, $\omega_n$ represents a natural vibration frequency, represents moment of inertia, $L_f$ represents a moment arm, $\theta_0$ represents an initial torsion angle, $\theta_0$ and $\dot{\theta}_0$ are constants, $\theta(t)$ represents a system response after variable substitution, and initial conditions $\theta(0)=0$ and $\dot{\theta}(0)=0$ are satisfied.

In the step S2, a transfer function of the digital filter is: and $$D(s) = \frac{\omega_{n1}^2}{\omega_n^2}\left[1 - 2(\zeta_1\omega_{n1} - \zeta\omega_n)\frac{s+\zeta_1\omega_{n1}}{(s+\zeta_1\omega_{n1})^2 + \omega_{d1}^2}\right] -$$

-continued $$\left. \frac{(\omega_{n1}^2 - \omega_n^2) - 2(\zeta_1\omega_{n1} - \zeta\omega_n)\zeta_1\omega_{n1}}{\omega_{d1}} \frac{\omega_{d1}}{(s+\zeta_1\omega_{n1})^2 + \omega_{d1}^2} \right]$$

a unit impulse response function of the digital filter is, $$d(t) = C_\omega^2 \left[ \delta(t) - 2(\zeta_1 C_\omega - \zeta)\omega_n e^{-\zeta_1 C_\omega \omega_n t} \cos\left(\sqrt{1-\zeta_1^2}\, C_\omega \omega_n t\right) - \frac{(C_\omega^2 - 1) - 2(\zeta_1 C_\omega - \zeta)\zeta_1 C_\omega}{\sqrt{1-\zeta_1^2}\, C_\omega} \omega_n e^{-\zeta_1 C_\omega \omega_n t} \sin\left(\sqrt{1-\zeta_1^2}\, C_\omega \omega_n t\right) \right]$$

where $\omega_n$ represents the natural vibration frequency, $\zeta$ represents the damping ratio, $\theta_{n1}$ represents a natural frequency of the equivalent-sensitivity high-frequency thrust measurement system, $\omega_{n1}=C_\omega\omega_n$, $C_\omega$ represents a frequency ratio, $\zeta_1$ represents a damping ratio of the equivalent-sensitivity high-frequency thrust measurement system, $\omega_{d1}=\sqrt{1-\zeta_1^2}\omega_{n1}$ represents an improved vibration frequency, $C_\omega>1$ and $\zeta_1=0.7\sim0.9$.

In the step S3, input of the digital filter is $\theta(\tau)$, $\theta(\tau)$ is computed according to a measured value $\theta'(\tau)$ of the displacement sensor, and a system response $\theta_1(t)$ output by the digital filter is: $\theta_1(t)=\int_0^t \theta(\tau)d(t-\tau)d\tau$, where $\tau$ is an integral variable.

In the step S4, under the situation that the system response is 1% greater than or less than a steady-state system response, corresponding time is the thrust response time.

The thrust response time includes thrust increasing time and thrust decreasing time.

In the step S5, a unit impulse response function $h_1(t)$, of the equivalent-sensitivity high-frequency thrust measurement system is, and $$h_1(t) = \frac{\omega_{n1}^2 L_f}{k\omega_{d1}} e^{-\zeta_1\omega_{n1}t} \sin(\omega_{d1}t)$$

what is known is that output of the digital filter is $\theta_1(t)$, and nominal thrust $f(\tau)$ is computed by means of an integral thrust equation for an equivalent-sensitivity high-frequency thrust measurement system: $\theta_1(t)=\int_0^t f(\tau)h_1(t-\tau)d\tau$.

An estimated value $F'(t)$ of the thrust $f'(t)$ to be measured is: $F'(t)=F(t)-f_0(t)$, where $$f_o(t) = -\frac{J}{L_f}(2\zeta\omega_n\dot\theta_0 + \omega_n^2\theta_0 t + \omega_n^2\theta_0),$$

$F(t)$ represents an estimated value of the nominal thrust $f(t)$, $\zeta$ represents a damping ratio, $\omega_n$ represents a natural vibration frequency, $J$ represents moment of inertia, $F_f$ represents a moment arm, $\theta_0$ represents an initial torsion angle, and $\theta_0$ and $\dot\theta_0$ are constants. Under the situation that the system response is 1% greater than or less than a steady-state system response, corresponding time is the thrust response time.

Beneficial Effects

According to the present disclosure, by connecting the digital filter in series on the thrust measurement system having a low natural frequency, the equivalent-sensitivity high-frequency thrust measurement system is constructed. Through a method for designing a digital filter, the natural frequency of the equivalent-sensitivity high-frequency thrust measurement system is greatly increased, time of entering a steady state is greatly shortened, and response time of rapid-varying thrust is measured. Moreover, the equivalent-sensitivity high-frequency thrust measurement system and the original thrust measurement system have equal sensitivity, such that equal-sensitivity measurement is realized. Through the design of the digital filter, a vibration frequency and a damping ratio may be adjusted. According to the requirement of measuring thrust increasing time and thrust decreasing time, rapid-varying thrust increasing time and thrust decreasing time are measured by adjusting the vibration frequency and the damping ratio.

DETAILED DESCRIPTION OF THE EMBODIMENTS

The specific implementations of the present disclosure will be described in detail below with reference to the accompanying drawings.

Figure 1:
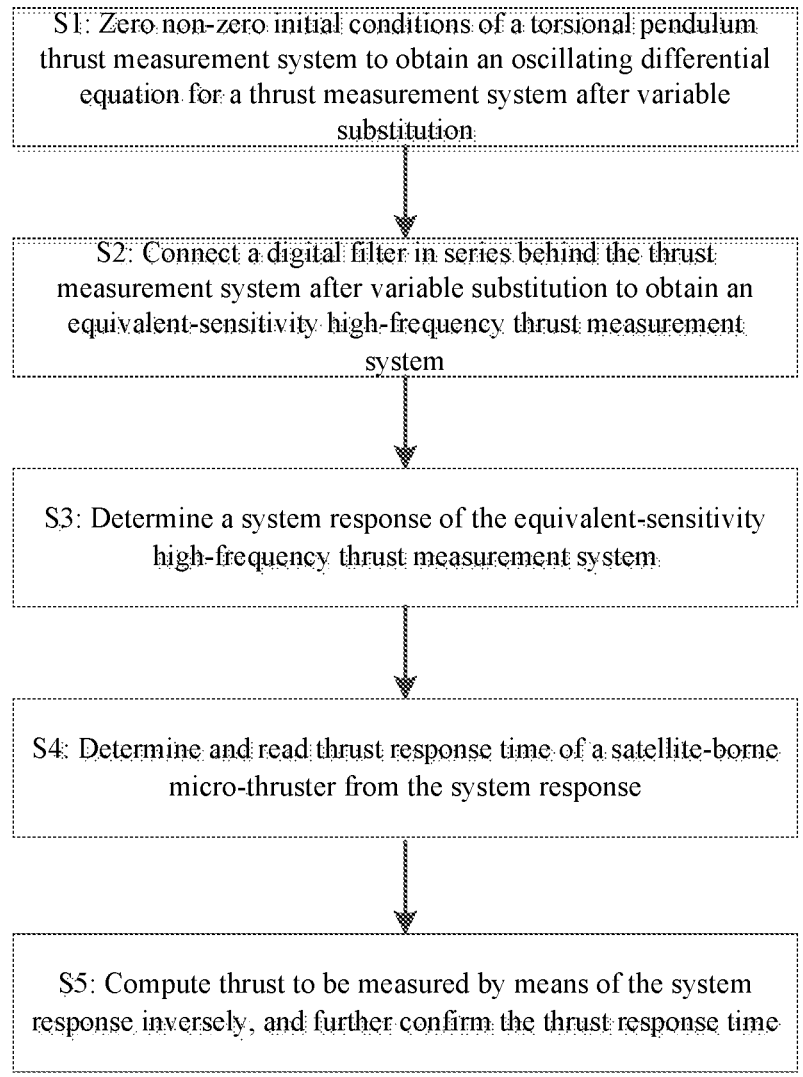
FIG. 1 is a flow diagram of a method for measuring thrust response time in the present disclosure.

As shown in FIG. 1, a flow diagram of a method for measuring thrust response time in the present disclosure is provided, and an implementation process will be described in detail below.

1. Establishing Relation Between Thrust Response Time and Time of Entering Steady State of Thrust Measurement System Establishing a relation between thrust response time and time of entering a steady state of a thrust measurement system is a necessary condition for the thrust measurement system to measure given thrust response time.

1) Thrust Response Time and Initial Conditions of Oscillating Differential Equation Thrust increasing time and thrust decreasing time are required to be considered for thrust response time of a micro-thruster. Under the situation that small steady thrust is increased into large steady thrust, thrust response time may be represented by thrust increasing time, and under the situation that large steady thrust is decreased into small steady thrust, thrust response time may be represented by thrust decreasing time. The effects of initial conditions are certainly required to be considered for researching thrust response time.

An oscillating differential equation for a torsional pendulum thrust measurement system is $$\ddot{\theta}'(t) + 2\zeta\omega_n\dot{\theta}'(t) + \omega_n^2\theta'(t) = \frac{L_f}{J}f'(t), \tag{1}$$

where f'(t) represents thrust to be measured, θ'(t) represents a system response (measured by a displacement sensor) under the action of thrust, ζ represents a damping ratio, $\omega_n$ represents a natural vibration frequency, J represents moment of inertia, and $L_f$ represents a moment arm.

Under the situation that thrust is varied from one steady thrust to another steady thrust, the initial conditions are not zero but are $$\theta'(0) = \theta_0 \text{ and } \dot{\theta}'(0) = \dot{\theta}_0 \tag{2},$$

where under the situation that thrust is varied from non-zero steady thrust, it may be approximately considered that $\dot{\theta}'(0) \approx 0$, and under the situation that thrust is varied from zero thrust, it may be approximately considered that $\theta'(0) \approx 0$ and $\dot{\theta}'(0) \approx 0$.

Obviously, the initial conditions of the oscillating differential equation for the thrust measurement system reflect from what initial thrust thrust is varied, for example, from a non-zero steady thrust or from zero thrust. Therefore, the initial conditions of the oscillating differential equation for the thrust measurement system are certainly required to be clearly defined for measuring the thrust response time.

2) Establishing Relation Between Thrust Response Time and Time of Entering Steady State An oscillating differential equation for a torsional pendulum thrust measurement system is $$\ddot{\theta}'(t) + 2\zeta\omega_n\dot{\theta}'(t) + \omega_n^2\theta'(t) = \frac{L_f}{J}f'(t). \tag{3}$$

Under the situation that the initial conditions are not zero but are $\theta'(0) = \theta_0$ and $\dot{\theta}'(0) = \dot{\theta}_0$, assuming that laplace transform of thrust is L[f'(t)]=F'(s), laplace transform of a system response and a derivative is $$L[\theta'(t)] = \Theta'(s) \tag{4}$$

$$L[\dot{\theta}'(t)] = s\Theta'(s) - \theta_0 \tag{5}$$

and $$L[\ddot{\theta}'(t)] = s^2\Theta'(s) - s\theta_0 - \dot{\theta}_0 \tag{6},$$

laplace transform is carried out on two sides of the oscillating equation, and finishing is carried out to obtain $$\Theta'-(s) = \frac{L_f}{J}F'(s)\frac{1}{(s+\zeta\omega_n)^2+\omega_d^2} + \frac{(s+\zeta\omega_n)\theta_0}{(s+\zeta\omega_n)^2+\omega_d^2} + \frac{\zeta\omega_n\theta_0+\dot{\theta}_0}{(s+\zeta\omega_n)^2+\omega_d^2}, \tag{7}$$

inverse laplace transform is carried out on two sides to obtain $$\theta'(t) = L^{-1}[\Theta'(s)] = \frac{L_f}{J\omega_d}\int_0^t f'(\tau)e^{-\zeta\omega_n(t-\tau)}\sin\omega_d(t-\tau)d\tau + \tag{8}$$

$$\theta_0 e^{-\zeta\omega_n t}\cos\omega_d t + \frac{\zeta\omega_n\theta_0+\dot{\theta}_0}{\omega_d}e^{-\zeta\omega_n t}\sin\omega_d t, \text{ and}$$

$$\theta'(t) = \theta_1'(t) + \theta_2'(t) \tag{9}$$

$$\theta_1'(t) = \frac{L_f}{J\omega_d}\int_0^t f(\tau)e^{-\zeta\omega_n(t-\tau)}\sin\omega_d(t-\tau)d\tau \tag{10}$$

$$\theta_2'(t) = \sqrt{\theta_0^2 + \left[\frac{\zeta\omega_n\theta_0+\dot{\theta}_0}{\omega_d}\right]^2}e^{-\zeta\omega_n t}\sin(\omega_d t + \beta) \text{ and} \tag{11}$$

$$\tan\beta = \frac{\omega_d\theta_0}{\zeta\omega_n\theta_0+\dot{\theta}_0} \tag{12}$$

are made, where θ'₁(t) includes a transient system response and a steady-state system response. For example, by substituting periodic thrust f'(t)=$A_f$ cos ωt ($A_f$ is a constant representing an amplitude of the periodic thrust, and ω represents a frequency of the periodic thrust) in θ'₁(t), a system response of a thrust measurement system is $$\theta_1'(t) = \frac{C}{\sqrt{1-\zeta^2}}e^{-\zeta\omega_n t}\cos(\omega_d t - \varphi_1) + C\cos(\omega t - \varphi_2), \tag{13}$$

where $C = A_f\frac{L_f}{k}\cdot\frac{1}{\sqrt{(1-R_\omega^2)^2+(2\zeta R_\omega)^2}}$ and $R_\omega = \frac{\omega}{\omega_n}$, (14)

where S=$L_f$/k represents sensitivity of the thrust measurement system, k=J$\omega_n^2$ represents a torsional stiffness coefficient, and $R_\omega = \omega/\omega_n$ represents a frequency ratio. Obviously, a first item of a system response in θ'₁(t) is a transient system response, which represents a variation of a transient process with time, and a vibration frequency of the transient process is a vibration frequency of a thrust measurement system. A second term is a steady-state system response, which represents a variation of a steady-state process with time, and a vibration frequency of a steady-state process is a vibration frequency of periodic thrust. θ'₂(t) is also a transient system response, a vibration frequency of which is a vibration frequency of a thrust measurement system.

In a word, an amplitude of a transient system response is gradually attenuated, an attenuation term is $e^{-\zeta\omega_n t}$, and assuming that corresponding time (corresponding time when a transient amplitude is attenuated to 1%) when the attenuation term is $e^{-\zeta\omega_n t}=0.01$ is defined as transient time or time $t_s$ of entering a steady state, $$t_s \approx \frac{4.605170}{\zeta\omega_n} \approx \frac{4.605170}{2\pi\zeta}\cdot\frac{2\pi}{\omega_n} \approx 0.73\frac{T_n}{\zeta}, \tag{15}$$

where $T_n = 2\pi/\omega_n$ is a natural period of a thrust measurement system.

Time of entering a steady state or transient time of a thrust measurement system are inherent properties of the thrust measurement system, and the following conclusions are drawn:

(1) the greater a natural frequency of a thrust measurement system, the less a period, and the shorter time of entering a steady state;

(2) the less a damping ratio of a thrust measurement system, the longer time of entering a steady state; and (3) only under the situation that thrust response time is longer than time of entering a steady state of a thrust measurement system, variation characteristics of thrust response time may be represented from a system response curve, or thrust response time may be determined and read from a system response curve.

For example, within a common damping ratio range $0.1 \leq \zeta \leq 0.3$, time of entering a steady state of a thrust measurement system is 3 times to 7 times a natural period, and assuming that thrust increasing time is $t_s$, and a natural period of a thrust measurement system is $T_n$, $$t_s \geq 7T_n \tag{16}.$$

Under the situation that thrust increasing time is required to be $t_s \leq 50$ ms, a natural period of a thrust measurement system is required to be $T_n \leq 7.1$ ms, that is, a linear frequency is $f_n \geq 140$ Hz, which is difficult to realize by any thrust measurement system of any structure. It is indicated that in order to measure response time of rapid-varying thrust, it is not enough to increase a natural frequency of a thrust measurement system only from the design of a physical structure, and another way should be explored.

2. Method for Zeroing Non-Zero Initial Conditions

During thrust response time measurement, initial conditions are not zero. However, during subsequent design of a digital filter and construction of an equivalent-sensitivity high-frequency thrust measurement system, since a model is established by means of a transfer function, non-zero initial conditions are certainly required to be zeroed.

An oscillating differential equation for a torsional pendulum thrust measurement system is $$\ddot{\theta}'(t) + 2\zeta\omega_n \dot{\theta}'(t) + \omega_n^2 \theta'(t) = \frac{L_f}{J} f'(t), \tag{17}$$

and initial conditions are not zero but are $$\theta'(0)=\theta_0 \text{ and } \dot{\theta}'(0)=\dot{\theta}_0 \tag{18}, \text{ where}$$

$\theta_0$ and $\dot{\theta}_0$ are constants.

In order to guarantee that the initial conditions are zero, variable substitution is carried out, that is, $$\theta(t)=\theta'(t)-\dot{\theta}_0 t-\theta_0 \tag{19}$$

$$\dot{\theta}(t)=\dot{\theta}'(t)-\dot{\theta}_0 \tag{20} \text{ and}$$

$$\ddot{\theta}(t)=\ddot{\theta}'(t) \tag{21} \text{ are made,}$$

an oscillating equation is substituted, and finishing is carried out to obtain $$\ddot{\theta}(t) + 2\zeta\omega_n \dot{\theta}(t) + \omega_n^2 \theta(t) = \frac{L_f}{J} f'(t) - 2\zeta\omega_n \dot{\theta}_0 - \omega_n^2 \dot{\theta}_0 t - \omega_n^2 \theta_0, \tag{22}$$

the initial conditions are substituted to obtain $$\theta(0)=0 \text{ and } \dot{\theta}(0)=0 \tag{23}, \text{ and}$$

an oscillating differential equation for a thrust measurement system after variable substitution is rewritten as $$\ddot{\theta}(t) + 2\zeta\omega_n \dot{\theta}(t) + \omega_n^2 \theta(t) = \frac{L_f}{J} f(t), \tag{24}$$

$$f(t) = f'(t) + f_0(t) \text{ and} \tag{25}$$

$$f_0(t) = -\frac{J}{L_f}\left(2\zeta\omega_n \dot{\theta}_0 + \omega_n^2 \dot{\theta}_0 t + \omega_n^2 \theta_0\right), \tag{26}$$

where $f_0(t)$ represents equivalent thrust related to non-zero initial conditions.

Under the situation that thrust is varied from one steady thrust to another steady thrust, $\theta'(0)=\theta_0$ and $\dot{\theta}'(0) \approx 0$, and then $$\theta(t)=\theta'(t)-\theta_0 \tag{27}.$$

Notes: a system response $\theta(t)$ after substitution is the same as a system response $\theta'(t)$ before substitution, a transient system response is the same as a steady-state system response, and only a system response curve moves up and down by a certain distance.

A method for zeroing non-zero initial conditions is as follows:

(1) A system response $\theta'(t)$ is measured by a displacement sensor under the action of thrust $f'(t)$ to be measured, and variable substitution is carried out according to non-zero initial conditions $(\theta_0, \dot{\theta}_0)$ to obtain $$\theta(t)=\theta'(t)-\dot{\theta}_0 t-\theta_0 \tag{28},$$

where $\theta(t)$ represents a system response after variable substitution, and zero initial conditions, that is, $\theta(0)=0$ and $\dot{\theta}(0)=0$ are satisfied.

(2) Under the situation that thrust is varied from one steady thrust to another steady thrust ($\theta'(0)=\theta_0$ and $\dot{\theta}'(0) \approx 0$), a system response $\theta(t)$ after variable substitution and a system response $\theta'(t)$ before substitution have the same time of entering a steady state such that thrust response time may be determined and read from a system response $\theta(t)$ curve after substitution.

(3) According to a system response $\theta(t)$ after variable substitution, nominal thrust $f(t)$ may be computed by means of an oscillating differential equation after variable substitution, such that thrust $f'(t)$ to be measured is obtained:

$$f'(t) = f(t) - f_0(t), \text{ and} \tag{29}$$

$$f_0(t) = -\frac{J}{L_f}\left(2\zeta\omega_n \dot{\theta}_0 + \omega_n^2 \dot{\theta}_0 t + \omega_n^2 \theta_0\right), \tag{30}$$

where $f_0(t)$ represents equivalent thrust related to non-zero initial conditions.

3. Constructing Equivalent-Sensitivity High-Frequency Thrust Measurement System by Means of Digital Filter In order to solve the problem that a natural frequency of a thrust measurement system is too low to satisfy the requirement of measuring response time of rapid-varying thrust, an equivalent-sensitivity high-frequency thrust measurement system is constructed by means of a digital filter, such that the natural frequency is greatly increased, and the requirement of measuring a response of rapid-varying thrust is satisfied.

Figure 2:
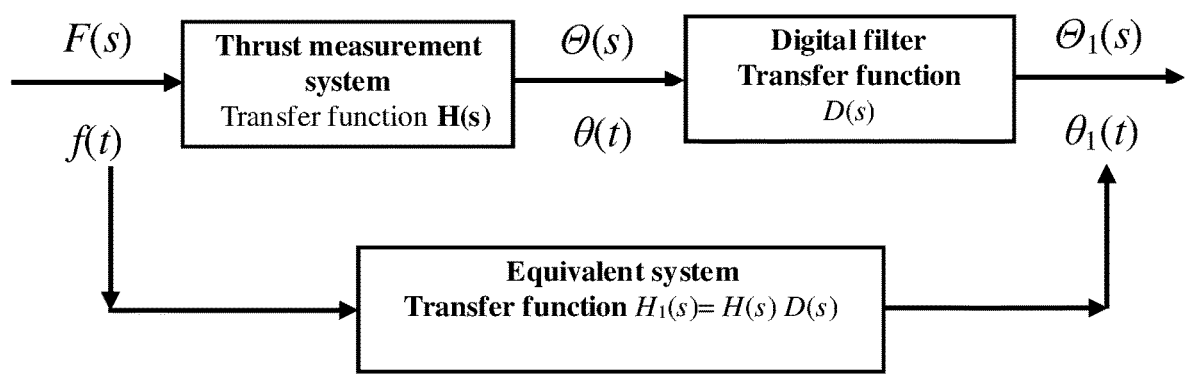
FIG. 2 is a schematic diagram of an equivalent-sensitivity high-frequency thrust measurement system in the present disclosure.
Figure 3:
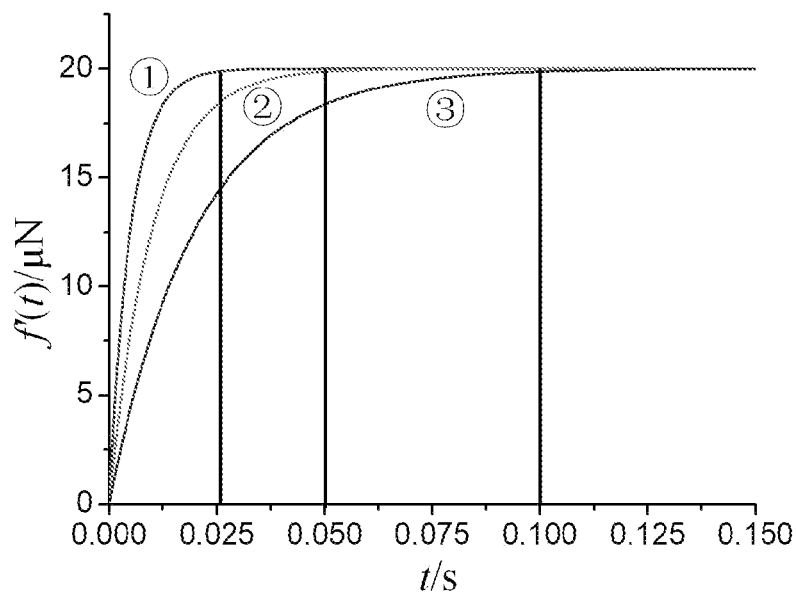
FIG. 3 is a variation graph of thrust increasing time.

As shown in FIG. 2, a schematic diagram of an equivalent-sensitivity high-frequency thrust measurement system in the present disclosure is shown. A method for constructing an equivalent-sensitivity high-frequency thrust measurement system by means of a digital filter is as follows:

(1) a digital filter is connected in series on a transfer function of a thrust measurement system after variable substitution to construct an equivalent-sensitivity high-frequency thrust measurement system;

(2) the constructed equivalent-sensitivity high-frequency thrust measurement system and a thrust measurement system before variable substitution have the same sensitivity, but a vibration frequency and a damping ratio may be adjusted through the design of the digital filter; and (3) according to the measurement requirements of thrust increasing time and thrust decreasing time, the thrust increasing time and the thrust decreasing time are measured by adjusting the vibration frequency and the damping ratio.

4. Method for Designing Digital Filter and Method for Computing System Response

1) Method for Designing Digital Filter

Assuming that input of a thrust measurement system after variable substitution is nominal thrust f(t) (laplace transform is F(s)), and a system response thereof is θ(t) (computed according to a measured value θ'(t) of a displacement sensor, and laplace transform is Θ(s)). A transfer function of a digital filter is D(s), input of the digital filter is θ(t), and output of the digital filter is $\theta_1(t)$ computed by means of θ(t), and laplace transform is $\Theta_1(s)$). A transfer function of a constructed equivalent-sensitivity high-frequency thrust measurement system is $H_1(s)=H(s)D(s)$, input of the equivalent-sensitivity high-frequency thrust measurement system is nominal thrust f(t), and output is $\theta_1(t)$.

A transfer function of a torsional pendulum thrust measurement system is $$H(s) = \frac{L_f}{J} \cdot \frac{1}{s^2 + 2\zeta\omega_n s + \omega_n^2} = \frac{L_f}{k} \cdot \frac{\omega_n^2}{s^2 + 2\zeta\omega_n s + \omega_n^2}, \quad (31)$$

where $L_f$ represents a moment arm, J represents moment of inertia, ζ represents a damping ratio, $\omega_n$ represents a natural vibration frequency, $\omega_d=\sqrt{1-\zeta^2}\omega_n$ represents a vibration frequency, and $k=J\omega_n^2$ represents a torsional stiffness coefficient.

A method for designing of a digital filter is to connect a digital filter in series to an output end of a thrust measurement system after variable substitution to form an improved torsional pendulum thrust measurement system. A transfer function of the improved torsional pendulum thrust measurement system is $$H_1(s) = \frac{L_f}{k_1} \cdot \frac{\omega_{n1}^2}{s^2 + 2\zeta_1\omega_{n1}s + \omega_{n1}^2}, \quad (32)$$

where a natural vibration frequency of the improved torsional pendulum thrust measurement system is $\omega_{n1}$, a damping ratio is $\zeta_1$, and a torsional stiffness coefficient is $k_1$.

Assuming that a transfer function of a digital filter is D(s), $$D(s) = \frac{H_1(s)}{H(s)} = \frac{\frac{L_f}{k_1} \cdot \frac{\omega_{n1}^2}{s^2 + 2\zeta_1\omega_{n1}s + \omega_{n1}^2}}{\frac{L_f}{k} \cdot \frac{\omega_n^2}{s^2 + 2\zeta\omega_n s + \omega_n^2}} = \left(\frac{k}{k_1}\right)\left(\frac{\omega_{n1}^2}{\omega_n^2} \cdot \frac{s^2 + 2\zeta\omega_n s + \omega_n^2}{s^2 + 2\zeta_1\omega_{n1}s + \omega_{n1}^2}\right). \quad (33)$$

In order to shorten time of entering a steady state and improve a capability of measuring thrust response time, a natural vibration frequency is required to be increased, and by making $\omega_{n1}=C_\omega\omega_n$ ($C_\omega>1$) and $k_1=k$ (having the same sensitivity), $$D(s) = \frac{\omega_{n1}^2}{\omega_n^2} \cdot \frac{s^2 + 2\zeta\omega_n s + \omega_n^2}{s^2 + 2\zeta_1\omega_{n1}s + \omega_{n1}^2}, \text{ and} \quad (34)$$

$$H_1(s) = \frac{L_f}{k} \cdot \frac{\omega_{n1}^2}{s^2 + 2\zeta_1\omega_{n1}s + \omega_{n1}^2}. \quad (35)$$

A transfer function of a digital filter is $$D(s) = \frac{\omega_{n1}^2}{\omega_n^2}\left[1 - \frac{2(\zeta_1\omega_{n1} - \zeta\omega_n)s}{s^2 + 2\zeta_1\omega_{n1}s + \omega_{n1}^2} - \frac{(\omega_{n1}^2 - \omega_n^2)}{s^2 + 2\zeta_1\omega_{n1}s + \omega_{n1}^2}\right] \quad (36)$$
$$= \frac{\omega_{n1}^2}{\omega_n^2}\left[1 - \frac{2(\zeta_1\omega_{n1} - \zeta\omega_n)s}{(s+\zeta_1\omega_{n1})^2 + \omega_{d1}^2} - \frac{(\omega_{n1}^2 - \omega_n^2)}{(s+\zeta_1\omega_{n1})^2 + \omega_{d1}^2}\right],$$

where $\omega_{d1}=\sqrt{1-\zeta_1^2}\omega_{n1}$ represents an improved vibration frequency. Through further simplification, a transfer function of a digital filter is $$D(s) = \frac{\omega_{n1}^2}{\omega_n^2}\left[1 - 2(\zeta_1\omega_{n1} - \zeta\omega_n)\frac{s+\zeta_1\omega_{n1}}{(s+\zeta_1\omega_{n1})^2 + \omega_{d1}^2}\right] - \quad (37)$$
$$\frac{(\omega_{n1}^2 - \omega_n^2) - 2(\zeta_1\omega_{n1} - \zeta\omega_n)\zeta_1\omega_{n1}}{\omega_{d1}} \cdot \frac{\omega_{d1}}{(s+\zeta_1\omega_{n1})^2 + \omega_{d1}^2}\right].$$

Assuming that a unit impulse response function of a digital filter is d(t), $$d(t) = L^{-1}[D(s)] \quad (38)$$
$$= \frac{\omega_{n1}^2}{\omega_n^2}\left[\delta(t) - 2(\zeta_1\omega_{n1} - \zeta\omega_n)e^{-\zeta_1\omega_{n1}t}\cos(\omega_{d1}t) - \frac{(\omega_{n1}^2 - \omega_n^2) - 2(\zeta_1\omega_{n1} - \zeta\omega_n)\zeta_1\omega_{n1}}{\omega_{d1}}e^{-\zeta_1\omega_{n1}t}\sin(\omega_{d1}t)\right],$$

and a unit impulse response function of a digital filter is $$d(t) = C_\omega^2\left[\delta(t) - 2(\zeta_1 C_\omega - \zeta)\omega_n e^{-\zeta_1 C_\omega\omega_n t}\cos\left(\sqrt{1-\zeta_1^2}C_\omega\omega_n t\right) - \quad (39)$$
$$\frac{(C_\omega^2 - 1) - 2(\zeta_1 C_\omega - \zeta)\zeta_1 C_\omega}{\sqrt{1-\zeta_1^2}C_\omega}\omega_n e^{-\zeta_1 C_\omega\omega_n t}\sin\left(\sqrt{1-\zeta_1^2}C_\omega\omega_n t\right)\right].$$

Input of the digital filter is θ(τ) (computed θ'(τ) according to a measured value of a displacement sensor), output of the digital filter is $\theta_1(t)$, then $$\theta_1(t)=\int_0^t \theta(\tau)d(t-\tau)d\tau \quad (40), \text{ and}$$

therefore, a system response of an equivalent-sensitivity high-frequency thrust measurement system is obtained.

A method for designing a digital filter is as follows:

(1) by taking equal sensitivity and increase in natural vibration frequency as objectives, a transfer function of a digital filter is designed;

(2) according to the transfer function of the digital filter, a unit impulse response function of the digital filter is obtained through inverse laplace transform; and (3) a system response of the digital filter is computed by means of a system response of a thrust measurement system after variable substitution.

2) Method for Computing System Response of Digital Filter

Output of a digital filter is required to be computed by means of a unit impulse response function thereof and through a numerical integration method.

Assuming that the unit impulse response function of the digital filter is d(t), $$d(t) = C_\omega^2 \left[ \delta(t) - 2(\zeta_1 C_\omega - \zeta)\omega_n e^{-\zeta_1 C_\omega \omega_n t} \cos\left(\sqrt{1-\zeta_1^2}\, C_\omega \omega_n t\right) - \frac{(C_\omega^2 - 1) - 2(\zeta_1 C_\omega - \zeta)\zeta_1 C_\omega}{\sqrt{1-\zeta_1^2}\, C_\omega} \omega_n e^{-\zeta_1 C_\omega \omega_n t} \sin\left(\sqrt{1-\zeta_1^2}\, C_\omega \omega_n t\right) \right]. \tag{41}$$

$$d(t) = d_1(t) + d_2(t), \tag{42}$$

$$d_1(t) = C_\omega^2 \delta(t), \text{ and} \tag{43}$$

$$d_2(t) = C_\omega^2 \left[ -2(\zeta_1 C_\omega - \zeta)\omega_n e^{-\zeta_1 C_\omega \omega_n t} \cos\left(\sqrt{1-\zeta_1^2}\, C_\omega \omega_n t\right) - \frac{(C_\omega^2 - 1) - 2(\zeta_1 C_\omega - \zeta)\zeta_1 C_\omega}{\sqrt{1-\zeta_1^2}\, C_\omega} \omega_n e^{-\zeta_1 C_\omega \omega_n t} \sin\left(\sqrt{1-\zeta_1^2}\, C_\omega \omega_n t\right) \right] \tag{44}$$

are made.

The following equation $$\theta_1(t) = \int_0^t \theta(\tau) d(t-\tau) d\tau \tag{45} \text{ is substituted to}$$

obtain $$\theta_1(t) = \vartheta_1(t) + \vartheta_2(t) \tag{46},$$

$$\vartheta_1(t) = \int_0^t \theta(\tau) d_1(t-\tau) d\tau = \int_0^t \theta(\tau) C_\omega^2 \delta(t-\tau) d\tau = C_\omega^2 \theta(t) \tag{47}, \text{ and}$$

$$\vartheta_2(t) = \int_0^t \theta(\tau) d_2(t-\tau) d\tau \tag{48},$$

where $\vartheta_1(t)$ may be directly computed according to a system response $\theta(t)$, and $\vartheta_2(t)$ is required to be computed through a numerical integration method.

In order to compute an integral equation for $\vartheta_2(t)$, assuming that a time sampling step is h, $t_i = ih (i=0, 1, 2, \ldots)$, and $$\vartheta_2(t_i) = \int_0^{t_i} \theta(\tau) d_2(t_i - \tau) d\tau \tag{49}.$$

Since $[t_0 = 0, t_i = ih]$ is divided into i equal parts, for $\tau_j = jh (j=0, 1, 2, \ldots, i)$, a function $$g(t_i, \tau_j) = \theta(\tau_j) d_2(t_i - \tau_j) \tag{50} \text{ is established}.$$

A method for computing $\vartheta_2(t)$ is to use a trapezoidal integral formula to start computation, and then to use three-point and four-point simpson integral formulas for computation, which is specifically as follows:

(1) Under the situation that there are n=1 sub-intervals, the trapezoidal integral formula is used to start computation.

$$\vartheta_2(t_1) = \frac{h}{2}[g(t_1, \tau_0) + g(t_1, \tau_1)] \tag{51}$$

(2) Under the situation that there are n=2 sub-intervals, the three-point (two intervals) simpson integral formula is used for computation.

$$\vartheta_2(t_2) = \frac{h}{3}[g(t_2, \tau_0) + 4g(t_2, \tau_1) + g(t_2, \tau_2)] \tag{52}$$

(3) Under the situation that there are n=3 sub-intervals, the four-point (three intervals) simpson integral formula is used for computation.

$$\vartheta_2(t_3) = \frac{3h}{8}[g(t_3, \tau_0) + 3g(t_3, \tau_1) + 3g(t_3, \tau_2) + g(t_3, \tau_3)] \tag{53}$$

(4) Under the situation that there are n=2k (k=2, 3, 4, . . . ) sub-intervals, the three-point simpson integral formula is used for computation.

An integral interval $[_0, t_{2k}]$ is divided into 2k equal parts by means of 2k+1 nodes $t_i = ih$ (i=0, 1, 2, . . . , 2k), each sub-interval has a length of $h = t_{2k}/(2k)$, and the three-point simpson integral formula is repeatedly used in each sub-interval such that a compound simpson formula may be obtained $$\vartheta_2(t_{2k}) = \frac{h}{3}[g(t_{2k}, \tau_0) + 4\sum_{i=1}^{k} g(t_{2k}, \tau_{2i-1}) + 2\sum_{i=1}^{k-1} g(t_{2k}, \tau_{2i}) + g(t_{2k}, \tau_{2k})]. \tag{54}$$

(5) Under the situation that there are n=2k+1 (k=2, 3, 4, . . . ) sub-intervals, the three-point and four-point simpson integral formulas are alternately used for computation.

An integral interval $[t_0, t_{2k+1}]$ is divided into 2k+1 equal parts by means of 2k+2 nodes $t_i = ih$ (i=0, 1, 2, . . . , 2k+1), each sub interval has a length of $h = t_{2k+1}/(2k+1)$, the three-point simpson integral formula is repeatedly used in first 2k−2 (k=2, 3, 4, . . . ) sub-intervals, and the four-point simpson integral formula is used in last four points, that is, 2k−2, 2k−1, 2k and 2k+1 such that a compound simpson formula may be obtained $$\vartheta_2(t_{2k+1}) = \frac{h}{3}[g(t_{2k+1}, \tau_0) + 4\sum_{i=1}^{k-1} g(t_{2k+1}, \tau_{2i-1}) + 2\sum_{i=1}^{k-2} g(t_{2k+1}, \tau_{2i})] + \frac{17h}{24} g(t_{2k+1}, \tau_{2k-2}) + \frac{9h}{8} g(t_{2k+1}, \tau_{2k-1}) + \frac{9h}{8} g(t_{2k+1}, \tau_{2k}) + \frac{3h}{8} g(t_{2k+1}, \tau_{2k+1}). \tag{55}$$

During computation of a system response of a digital filter, a natural frequency $\omega_n$ and a damping ratio $\zeta$ of a thrust measurement system before variable substitution are known, a natural frequency $\omega_{n1} = C_\omega \omega_n$ of an equivalent-sensitivity high-frequency thrust measurement system (realized by selecting a frequency ratio $C_\omega > 1$) is selected according to the requirement of measuring thrust response time, and by selecting the damping ratio $\zeta_1 = 0.7 \sim 0.9$, time of entering a steady state is further shortened.

5. Method for Inversely Computing Thrust by Means of Equivalent-Sensitivity High-Frequency Thrust Measurement System Since a natural frequency of an equivalent-sensitivity high-frequency thrust measurement system is greatly increased, response time of rapid-varying thrust may be measured.

On the one hand, from system response of a digital filter, that is, system response of an equivalent-sensitivity high-frequency thrust measurement system, thrust increasing time and thrust decreasing time may be indirectly determined and read. On the other hand, according to the system response of the digital filter (that is, the system response of the equivalent-sensitivity high-frequency thrust measurement system), thrust may be inversely computed by means of a transfer function and a unit impulse response function of the equivalent-sensitivity high-frequency thrust measurement system such that the thrust increasing time and the thrust decreasing time may be further confirmed. In this way, the thrust response time may be determined and read more reasonable and reliable.

1) Establishing Integral Thrust Equation for Equivalent-Sensitivity High-Frequency Thrust Measurement System A transfer function of an equivalent-sensitivity high-frequency thrust measurement system is $$H_1(s) = \frac{L_f}{k} \cdot \frac{\omega_{n1}^2}{s^2 + 2\zeta_1\omega_{n1}s + \omega_{n1}^2}, \tag{56}$$

and a unit impulse response function $h_1(t)$ of the equivalent-sensitivity high-frequency thrust measurement system is $$h_1(t) = L^{-1}[H_1(s)] = \frac{\omega_{n1}^2 L_f}{k\omega_{d1}} e^{-\zeta_1\omega_{n1}t}\sin(\omega_{d1}t). \tag{57}$$

What is known is that output of the digital filter is $\theta_1(t)$, and assuming that nominal thrust is $f(\tau)$, the integral thrust equation for the equivalent-sensitivity high-frequency thrust measurement system is $$\theta_1(t)=\int_0^t f(\tau)h_1(t-\tau)d\tau \tag{58}$$

The above equation is called integral thrust equation, and according to the integral thrust equation, the nominal thrust $f(\tau)$ may be inversely computed by means of $\theta_1(t)$.

2) Computing Thrust by Means of Integral Thrust Equation in Discretization Manner A unit impulse response function $h_1(t)$ of an equivalent-sensitivity high-frequency thrust measurement system is substituted into an integral thrust equation to obtain $$C_f\theta_1(t) = \int_0^t f(\tau)e^{-\zeta_1\omega_{n1}(t-\tau)}\sin\omega_{d1}(t-\tau)d\tau, \tag{59}$$

$$C_f = \frac{k\omega_{d1}}{\omega_{n1}^2 L_f}, \omega_{d1} = \sqrt{1-\zeta_1^2}\,\omega_{n1} \text{ and } \omega_{n1} = C_\omega\omega_n. \tag{60}$$

What is known is that the system response of the equivalent-sensitivity high-frequency thrust measurement system is $[t_i, \theta_1(t_i)]$ ($i=0, 1, 2, 3, \ldots$), $\theta_1(t_0)=0$ under the situation that $t_0=0$, a sampling time step is $h$, $t_i=ih$, and $\theta_1(t)=\theta_{1i}$ and $F(t_i)=F_i$. For any given $t_i=ih$ ($i=1, 2, 3\ldots$), an integral thrust equation is $$C_f\theta_{1i}=\int_0^{ih} F(\tau)e^{-\zeta_1\omega_{n1}(ih-\tau)}\sin\omega_{d1}(ih-\tau)d\tau \tag{61},$$

where replacing $f(\tau)$ with $F(\tau)$ means that $F(\tau)$ is an estimated value of thrust $f(\tau)$.

An interval $[0, t_i]$ is divided into $i$ equal parts ($i=1, 2, 3, \ldots$), a node is $\tau_j=jh$ ($j=0, 1, \ldots, i$), and an integrated function is $$G(t_i,\tau_j)=F(\tau_j)e^{-\zeta_1\omega_{n1}(t_i-\tau_j)}\sin\omega_{d1}(t_i-\tau_j) \tag{62},$$

and $$G(t_i,\tau_0)=G(t_i,0)=F_0 e^{-\zeta_1\omega_{n1}(ih)}\sin\omega_{d1}(ih) \tag{63} \text{ and}$$

$$G(t_i,\tau_i)=F(\tau_i)e^{-\zeta_1\omega_{n1}(t_i-\tau_i)}\sin\omega_{d1}(t_i-\tau_i)=0 \tag{64} \text{ are satisfied.}$$

Three-point and four-point simpson integral formulas are required to be used for discretizing an integral thrust equation group into a linear thrust equation group through a compound simpson discretization method, which will be discussed by means of the following five situations.

(1) Under the situation that $i=1$, computation is started according to a trapezoidal integral formula to obtain $$C_f\theta_{11} = \int_0^h F(\tau)e^{-\zeta_1\omega_{n1}(h-\tau)}\sin\omega_{d1}(h-\tau)d\tau = \frac{h}{2}e^{-\zeta_1\omega_{n1}h}\sin(\omega_{d1}h)F_0 \tag{65}$$

and $$a_{10}F_0 = C_f\theta_{11} \text{ and } a_{10} = \frac{h}{2}e^{-\zeta_1\omega_{n1}h}\sin\omega_{d1}h.$$

(2) Under the situation that $i=2$, according to a three-point simpson integral formula, it can be known that, $$C_f\theta_{12} = \int_0^{2h} F(\tau)e^{-\zeta_1\omega_{n1}(2h-\tau)}\sin\omega_{d1}(2h-\tau)d\tau = \tag{66}$$

$$\frac{h}{3}e^{-\zeta_1\omega_{n1}(2h)}\sin\omega_{d1}(2h)F_0 + \frac{4h}{3}e^{-\zeta_1\omega_{n1}(h)}\sin\omega_{d1}(h)F_1$$

and $$a_{20}F_0 + a_{21}F_1 = C_f\theta_{12},$$

$$a_{20} = \frac{h}{3}e^{-\zeta_1\omega_{n1}(2h)}\sin\omega_{d1}(2h) \text{ and } a_{21} = \frac{4h}{3}e^{-\zeta_1\omega_{n1}(h)}\sin\omega_{d1}(h) \tag{67}$$

may be obtained.

(3) Under the situation that $i=3$, according to a four-point simpson integral formula, it may be known that $$C_f\theta_{13} = \tag{68}$$

$$\int_0^{3h} F(\tau)e^{-\zeta_1\omega_{n1}(3h-\tau)}\sin\omega_{d1}(3h-\tau)d\tau = \frac{3h}{8}e^{-\zeta_{\omega n1}(3h)}\sin\omega_{d1}(3h)F_0 +$$

$$\frac{9h}{8}e^{-\zeta_1\omega_{n1}(2h)}\sin\omega_{d1}(2h)F_1 + \frac{9h}{8}e^{-\zeta_1\omega_{n1}(h)}\sin\omega_{d1}(h)F_2$$

and $$a_{30}F_0 + a_{31}F_1 + a_{32}F_2 = C_f\theta_{13}$$

$$a_{30} = \frac{3h}{8}e^{-\zeta_1\omega_{n1}(3h)}\sin\omega_{d1}(3h), \tag{69}$$

$$a_{31} = \frac{9h}{8}e^{-\zeta_1\omega_{n1}(2h)}\sin\omega(2h) \text{ and}$$

$$a_{32} = \frac{9h}{8}e^{-\zeta_1\omega_{n1}(h)}\sin\omega_{d1}(h)$$

may be obtained.

(4) Under the situation that $i=2k$ ($k=2, 3, \ldots$) according to the three-point simpson integral formula, it may be obtained that $$C_f \theta_{1i} = \tag{70}$$

$$\int_0^{ih} F(\tau)e^{-\zeta_1\omega_{n1}(ih-\tau)}\sin\omega_{d1}(ih-\tau)d\tau = \frac{h}{3}e^{-\zeta_1\omega_{n1}(ih)}\sin\omega_{d1}(ih)F_0 +$$

$$\frac{4h}{3}\sum_{j=1}^{k}e^{-\zeta_1\omega_{n1}[i-(2j-1)]h}\sin\omega_{d1}[i-(2j-1)]hF_{2j-1} +$$

$$\frac{2h}{3}\sum_{j=1}^{k-1}e^{-\zeta_1\omega_{n1}(i-2j)h}\sin\omega_{d1}(i-2j)hF_{2j}$$

and $$a_{i0}F_0 + \sum_{l=1}^{2k-1}a_{il}F_l = C_f\theta_{1i} \ (i=2k; k=2,3,\ldots),$$

$$a_{i0} = \frac{h}{3}e^{-\zeta_1\omega_{n1}(ih)}\sin\omega_{d1}(ih), \tag{71}$$

$$a_{il} = \frac{4h}{3}e^{-\zeta_1\omega_{n1}(i-l)h}\sin\omega_{d1}(i-l)h \ (l=1,3,\ldots,2k-1) \text{ and} \tag{72}$$

$$a_{il} = \frac{2h}{3}e^{-\zeta_1\omega_{n1}(i-l)h}\sin\omega_{d1}(i-l)h \ (l=2,4,,2k-2) \tag{73}$$

may be obtained.

(5) Under the situation that i=2k+1 (k=2, 3, . . . ), in 2k+2 points, the three-point simpson integral formula is used for first i=0, 1, . . . , 2k−3, 2k−2 equal points, and the four-point simpson integral formula is used for last four points i=2k−2, 2k−1, 2k, 2k+1, and may be obtained, $$C_f\theta_{1i} = \int_0^{ih} F(\tau)e^{-\zeta_1\omega_{n1}(ih-\tau)}\sin\omega_{d1}(ih-\tau)d\tau = \tag{74}$$

$$\frac{h}{3}e^{-\zeta_1\omega_{n1}(ih)}\sin\omega_{d1}(ih)F_0 +$$

$$\frac{4h}{3}\sum_{j=1}^{k-1}e^{-\zeta_1\omega_{n1}[i-(2j-1)]h}\sin\omega_{d1}[i-(2j-1)]hF_{2j-1} +$$

$$\frac{2h}{3}\sum_{j=1}^{k-2}e^{-\zeta_1\omega_{n1}(i-2j)h}\sin\omega_{d1}(i-2j)hF_{2j} +$$

$$\frac{17h}{24}e^{-\zeta_1\omega_{n1}[i-(2k-2)]h}\sin\omega_{d1}[i-(2k-2)]hF_{2k-2} + \frac{9h}{8}e^{-\zeta_1\omega_{n1}[i-(2k-1)]h}$$

$$\sin\omega_{d1}[i-(2k-1)]hF_{2k-1} + \frac{9h}{8}e^{-\zeta_1\omega_{n1}(i-2k)h}\sin\omega_{d1}(i-2k)hF_{2k}$$

that is, $$a_{i0}F_0 + \sum_{l=1}^{2k}a_{il}F_l = C_f\theta_{1i}(i=2k+1; k=2,3,\ldots),$$

$$a_{i0} = \frac{h}{3}e^{-\zeta_1\omega_{n1}(ih)}\sin\omega_{d1}(ih), \tag{75}$$

$$a_{il} = \frac{4h}{3}e^{-\zeta_1\omega_{n1}(i-l)h}\sin\omega_{d1}(i-l)h \quad (l=1,3,\ldots,2k-3), \tag{76}$$

$$a_{il} = \frac{2h}{3}e^{-\zeta_1\omega_{n1}(i-l)h}\sin\omega_{d1}(i-l)h \quad (l=2,4,\ldots,2k-4), \tag{77}$$

$$a_{il} = \frac{17h}{24}e^{-\zeta_1\omega_{n1}(i-l)h}\sin\omega_{d1}(i-l)h \quad l=2k-2 \text{ and} \tag{78}$$

$$a_{il} = \frac{9h}{8}e^{-\zeta_1\omega_{n1}(i-l)h}\sin\omega_{d1}(i-l)h \quad l=2k-1,2k. \tag{79}$$

(6) An estimated value F(τ) of nominal thrust f(τ) is computed, and assuming that the estimated value of the thrust F'(τ) to be measured is f'(τ), the estimated value of the thrust to be measured is obtained:

$$F'(t) = F(t) - f_0(t), \text{ and} \tag{80}$$

$$f_0(t) = -\frac{J}{L_f}(2\zeta\omega_n\dot{\theta}_0 + \omega_n^2\dot{\theta}_0 t + \omega_n^2\theta_0). \tag{81}$$

In the steps (1) to (5), a linear equation is represented in a matrix form, then $$\begin{bmatrix} a_{10} & \cdots & 0 & 0 \\ a_{20} & a_{21} & \cdots & 0 \\ \vdots & \vdots & \cdots & \vdots \\ a_{n,0} & a_{n,1} & \cdots & a_{n,n-1} \end{bmatrix} \begin{bmatrix} F_0 \\ F_1 \\ \vdots \\ F_{n-1} \end{bmatrix} = \begin{bmatrix} C_f\theta_{11} \\ C_f\theta_{12} \\ \vdots \\ C_f\theta_{1n} \end{bmatrix}. \tag{82}$$

The three-point simpson formula and four-point simpson formula are required to be alternately used for compound simpson computation method for thrust, such that construction of the computation method is complex. However, since a truncation error of the compound simpson formula is proportional to a time step $h^4$, computation accuracy is greatly increased.

As shown in FIG. 1, a digital filter based method for measuring thrust response time of a satellite-borne micro-thruster in the present disclosure includes the following steps:

S1: zero non-zero initial conditions of a torsional pendulum thrust measurement system to obtain an oscillating differential equation for a thrust measurement system after variable substitution;

S2: connect the digital filter in series behind the thrust measurement system after variable substitution to obtain an equivalent-sensitivity high-frequency thrust measurement system;

S3: determine a system response of the equivalent-sensitivity high-frequency thrust measurement system;

S4: determine and read thrust response time of a satellite-borne micro-thruster from the system response; and S5: compute thrust to be measured by means of an equivalent-sensitivity high-frequency thrust measurement system inversely, and further confirm the thrust response time.

A detailed description will be made below in combination with specific embodiments.

Embodiment

What is known is that a torsional stiffness coefficient of a torsional pendulum thrust measurement system is k=0.075 N·m/rad, a vibration frequency is $\omega_d$=0.25 rad/s, a damping ratio is ζ=0.2, a natural frequency is $\omega_n$=0.255155 rad/s (a natural linear frequency is $f_n$=0.040609 Hz, and a natural period is 24.6 s), moment of inertia is J=1152002 kg·m², and a moment arm is $L_f$=0.4 m.

Moment of inertia of a torsional pendulum rotary component carrying a thrust head of 3 kg and a counterweight of 3 kg is 2×3×0.42=0.96 kg·m², and moment of inertia of the rotary component further carrying a damper, a calibration force device, a J=1.152002 kg·m² beam, etc. is Thrust response time being 25 ms ↘ 50 ms ↘ 100 ms is measured respectively by means of a thrust measurement system through a digital filter based method for measuring thrust response time.

Initial conditions are: $\theta_0$=50 μrad and $\dot{\theta}_0$=0.

Since sensitivity is $S=L_f/k$, and the initial conditions are $\theta_0$=50 μrad and $\dot{\theta}_0$=0, corresponding thrust is:

$$\frac{\theta_0}{S} = \frac{k}{L_f}\theta_0 = \frac{0.075}{0.4} \times 50 = 9.375 \mu N,$$

which indicates that the thrust varies from 9.375 ρN.

1. Establishing Relation Between Thrust Response Time and Time of Entering Steady State of Thrust Measurement System Time of entering a steady state of a thrust measurement system is.

$$t_s \approx 0.73 \times \frac{24.6}{0.2} \approx 89.8s$$

Therefore, the thrust measurement system may be only used for measuring thrust response time longer than 89.8 s, but is far from satisfying the requirement of measuring thrust response time being 25 ms ↘ 50 ms ↘ 100 ms.

2. Method for Zeroing Non-Zero Initial Conditions

A system response θ'(t) is measured by a displacement sensor under the action of thrust f'(t) to be measured. Herein, in order to test a digital filter based method for measuring thrust response time, a thrust function in a form of: f'(t)=20 [1−exp(−t/τ)] (unit: μN).

where τ is a time constant representing thrust increasing time, and the thrust increasing time is $t_f$≈5τ. A measured value θ'(t) of a displacement sensor is computed by means of f'(t) according to an oscillating differential equation before variable substitution.

In order to research situations of thrust response time being 25 ms ↘ 50 ms ↘ 100 ms respectively, time constants of thrust are valued to be τ=5 ms ↘ 10 ms ↘ 20 ms respectively. As shown in FIG. ①, ②, and ③ are variations of thrust increasing time under the situations that thrust response time is 25 ms ↘ 50 ms ↘ 100 ms (thrust is varied from 9.375 μN to 29.375 μN, and a thrust increased quantity is f'(t)).

Figure 4:
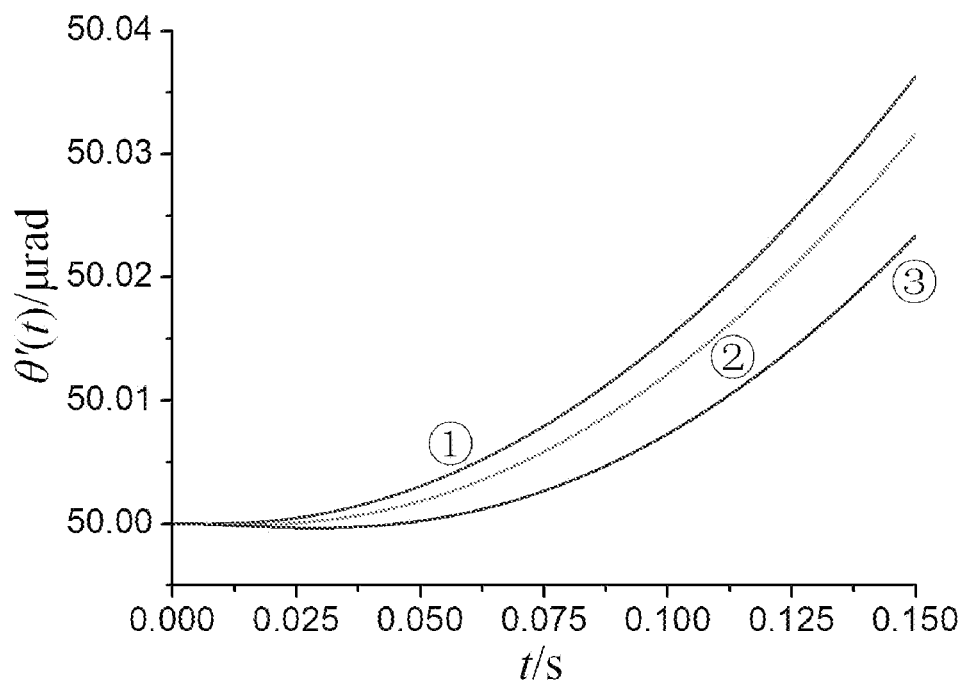
FIG. 4 is a graph of measured values of system responses of an original thrust measurement system.

As shown in FIG. 4, ①, ② and ③ are measured values of system responses of an original thrust measurement system under the situations that thrust response time is 25 ms ↘ 50 ms ↘ 100 ms.

According to the initial conditions $\theta_0$50 μrad and $\dot{\theta}_0$=0, variable substitution is carried out, a system response after variable substitution is: $\theta(t)=\theta'(t)-\dot{\theta}_0 t-\theta_0$.

Figure 5:
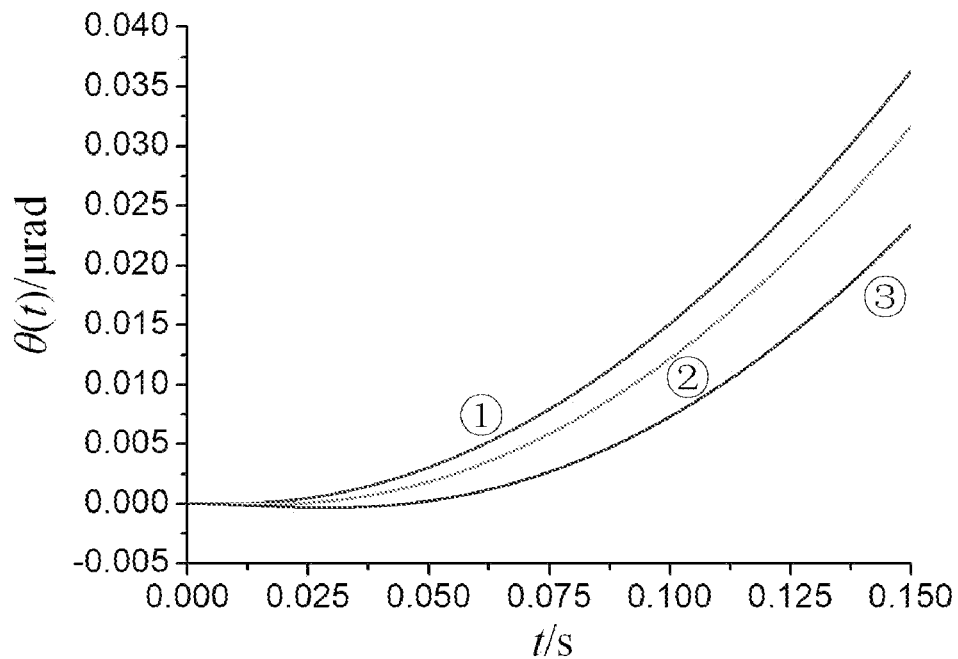
FIG. 5 is a variation graph of system responses after variable substitution.

As shown in FIG. 5, ①, ② and ③ are variations of a system response after variable substitution under the situations that thrust response time is 25 ms ↘ 50 ms ↘ 100 ms.

After variable substitution, an oscillating differential equation for a thrust measurement system is $$\ddot{\theta}(t) + 2\zeta\omega_n\dot{\theta}(t) + \omega_n^2\theta(t) = \frac{L_f}{J}f(t)$$

where $$f(t) = f'(t) + f_0(t),$$

$$f_0(t) = -\frac{J}{L_f}\left(2\zeta\omega_n\dot{\theta}_0 + \omega_n^2\dot{\theta}_0 t + \omega_n^2\theta_0\right)$$

where $f_0(t)$ represents equivalent thrust related to a non-zero initial condition.

3. Constructing Equivalent-Sensitivity High-Frequency Thrust Measurement System by Means of Digital Filter After variable substitution, a digital filter is connected in series to a transfer function of a thrust measurement system to construct an equivalent-sensitivity high-frequency thrust measurement system.

As shown in FIG. 2, after variable substitution, the transfer function of the thrust measurement system is H(s) input thereof is nominal thrust f(t) to be computed, and output thereof is computed θ(t). The transfer function of the digital filter connected in series is D(s) input of the digital filter is θ(t), and output of the digital filter is $\theta_1(t)$ (computed by means of θ(t)). The transfer function of the constructed equivalent-sensitivity high-frequency thrust measurement system is $H_1(s)=H(s)D(s)$, input of the equivalent-sensitivity high-frequency thrust measurement system is nominal thrust f(t), and output is $\theta_1(t)$.

4. Method for Designing Digital Filter and Method for Computing System Response

In order to shorten time of entering a steady state and improve a capability of measuring thrust response time, a natural vibration frequency is required to be increased, and by making $\omega_{n1}=C_\omega\omega_n$ ($C_\omega$>1) and $k_1$=k (having equal sensitivity), output of the digital filter is $\theta_1(t)$, $\theta_1(t)=\int_0^t\theta(\tau)d(t-\tau)d\tau$, where d(t) represents a unit impulse response function of the digital filter, which is obtained through design of the digital filter.

A system response $\theta_1(t)$ of an equivalent-sensitivity high-frequency thrust measurement system is computed through a digital filter based method for computing a system response.

A frequency ratio $C_\omega$=1000 of the equivalent-sensitivity high-frequency thrust measurement system is selected, then a natural frequency is $\omega_{n1}$=255.155 rad/s (a natural frequency is increased from 0.255155 rad/s before variable substitution to 255.155 rad/s after variable substitution, that is, a natural period becomes 24.6 ms), a damping ratio $\zeta_1$=0.7 is selected, and time of entering a steady state of a thrust measurement system after variable substitution is:

$$t_s \approx 0.73 \times \frac{24.6}{0.7} \approx 25.7 \text{ ms}$$

Figure 6:
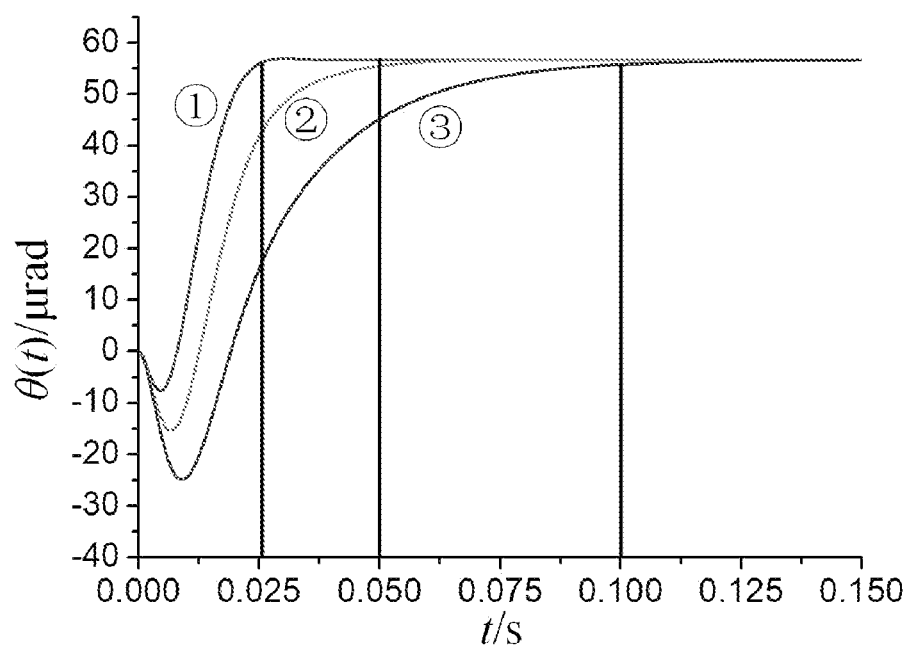
FIG. 6 is a variation graph of system responses of a digital filter.

As shown in FIG. 6, ①, ②, ③ are system responses (computed according to data in FIG. 5) of a digital filter respectively. From FIG. 6, thrust response time of applied thrust may be determined and read as 25 ms ↘ 50 ms ↘ 100 ms respectively, and thrust response time 25 ms is just used for determination and read.

5. Method for Inversely Computing Thrust by Means of Equivalent-Sensitivity High-Frequency Thrust Measurement System What is known is that output of the digital filter is θ1(t), and assuming that nominal thrust is f(τ), the integral thrust equation for the equivalent-sensitivity high-frequency thrust measurement system is.

$$\theta_1(t)=\int_0^t f(\tau)h_1(t-\tau)d\tau$$

Nominal thrust f(τ) may be inversely computed by means of $\theta_1(t)$ according to an integral thrust equation.

According to the constructed integral thrust equation, a linear thrust equation group is established through a numerical integral discretization method, and an estimated value F(τ) of the nominal thrust f(τ) is computed. Assuming that the estimated value of the thrust f'(τ) to be measured is F'(τ), the estimated value of the thrust to be measured is obtained.

$$F'(t)=F(t)-f_0(t)$$

$$f_o(t) = -\frac{J}{L_f}\left(2\zeta\omega_n\dot{\theta}_0 + \omega_n^2\dot{\theta}_0 t + \omega_n^2\theta_0\right)$$

An error of the estimated value F'(τ) of the thrust f'(τ) to be measured is, $$\frac{\Delta F'(\tau)}{f'(t)} = \frac{F'(\tau) - f'(t)}{f'(t)}$$

where a thrust function is in a form of f'(t)=20[1−exp(−t/τ)] (unit: μN), where time constant distribution of thrust is valued to be τ=5 ms ↘ 10 ms ↘ 20 ms.

Figure 7:
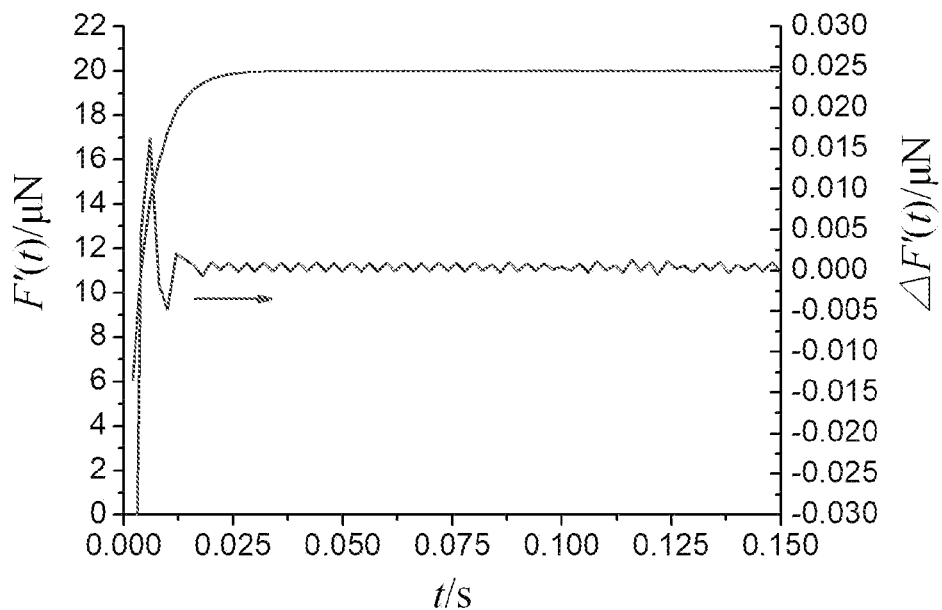
FIG. 7 is a graph of thrust and errors inversely computed under the situation that thrust increasing time is 25 ms.

As shown in FIG. 7, thrust and errors inversely computed under the situation that thrust increasing time is 25 ms are shown. From FIG. 7, it is clearly determined that a thrust time response is 25 ms and a thrust error is less than 0.5% after 20 ms.

Figure 8:
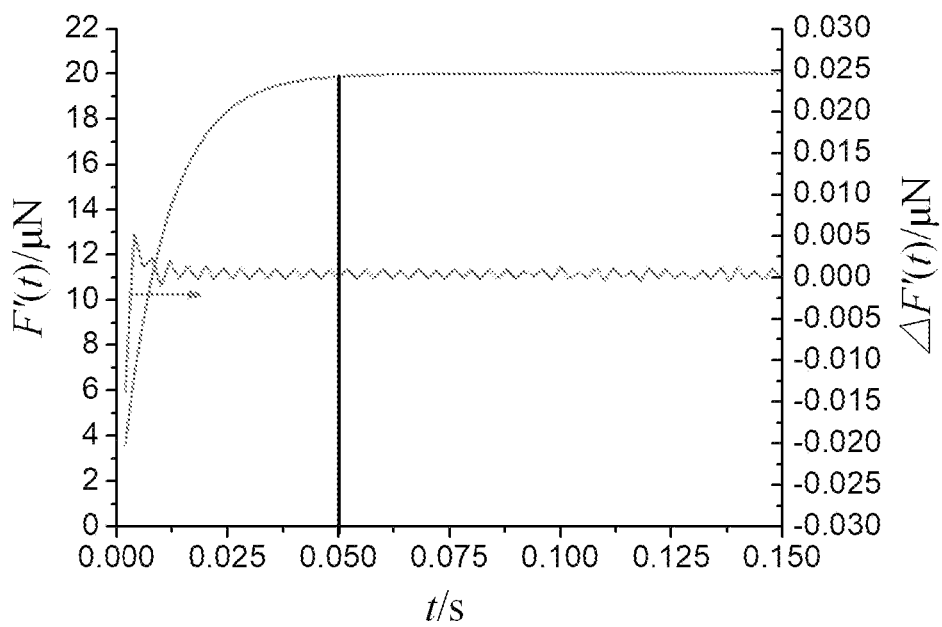
FIG. 8 is a graph of thrust and errors inversely computed under the situation that thrust increasing time is 50 ms.

As shown in FIG. 8, thrust and errors inversely computed under the situation that thrust increasing time is 50 ms are shown. From FIG. 8, it is clearly determined that a thrust time response is 50 ms and a thrust error is less than 0.5% after 20 ms.

Figure 9:
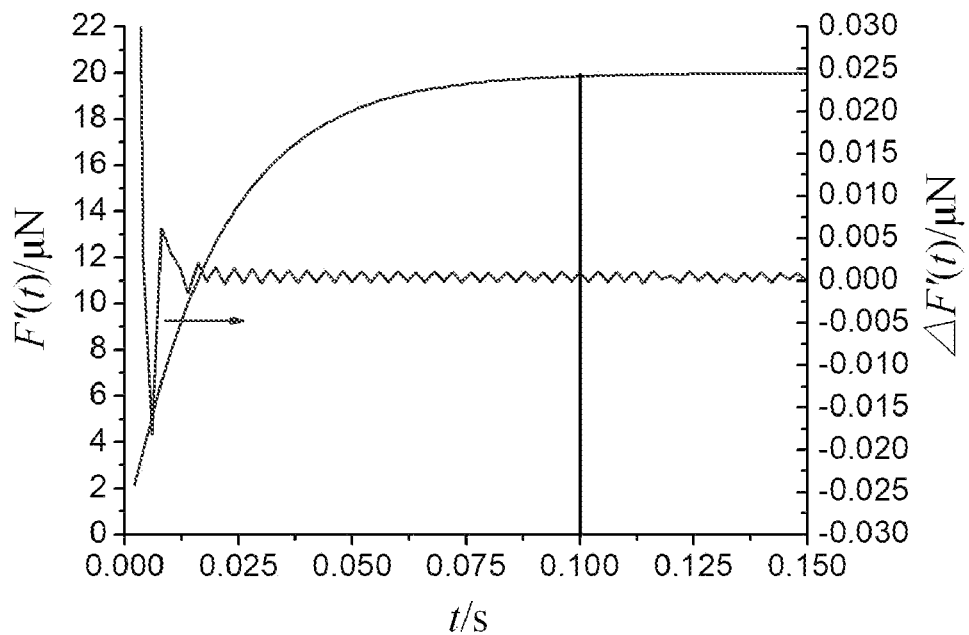
FIG. 9 is a graph of thrust and errors inversely computed under the situation that thrust increasing time is 100 ms.

As shown in FIG. 9, thrust and errors inversely computed under the situation that thrust increasing time is 100 ms are shown. From FIG. 9, it is clearly determined that a thrust time response is 100 ms and a thrust error is less than 0.5% after 20 ms.

6. Measurement Situations of Thrust Decreasing Time

Measurement situations of thrust decreasing time under the situation that thrust is gradually decreased will be described below with examples.

A thrust function is in a form of: f'(t)=—20[1−exp(−t/τ)] (unit: μN), where under the situation that a thrust time constant is valued to be τ=5 ms ↘ 10 ms ↘ 20 ms, thrust decreasing time is τ_f=25 ms ↘ 50 ms ↘ 100 ms.

The above thrust is substituted into the following oscillating differential equation for a torsional pendulum thrust measurement system.

$$\ddot{\theta}'(t) + 2\zeta\omega_n\dot{\theta}'(t) + \omega_n^2\theta'(t) = \frac{L_f}{J}f'(t)$$

Initial conditions are: θ₀=150 μrad and $\dot{\theta}_0$=0, where a damping ratio is ζ=0.2, a natural frequency is ω_n=0.255155 rad/s, moment of inertia is J=1.152002 kg·m², and moment arm is L_f=0.4. A measured value of θ'(t) as a system response is obtained through a numerical computation method of an ordinary differential equation.

The initial conditions are θ₀=150 μrad and $\dot{\theta}_0$=0, which represent that thrust is gradually decreased from 28.125 μN, and a decreased quantity is 20 μN (thrust is decreased from 28.125 μN to 8.125 μN).

Figure 10:
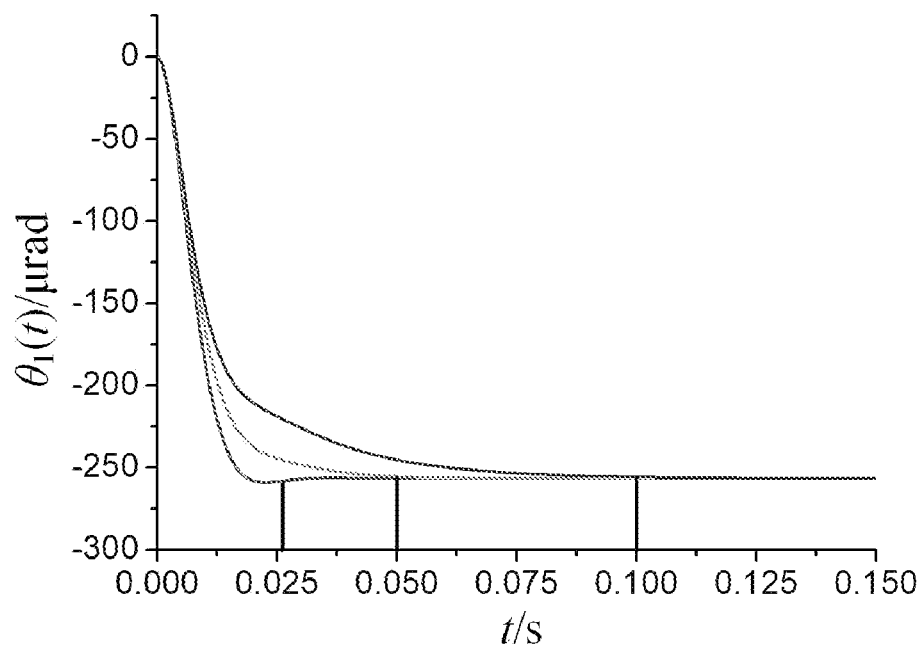
FIG. 10 is a variation graph of system responses of a digital filter under the situation that thrust is gradually decreased.

As shown in FIG. 10, variations of system responses of a digital filter (computed by means of θ'(t)) are shown. From FIG. 10, thrust decreasing time may be determined and read as 25 ms ↘ 50 ms ↘ 100 ms respectively, and the thrust decreasing time 25 ms is just used for determination and read.

Figure 11:
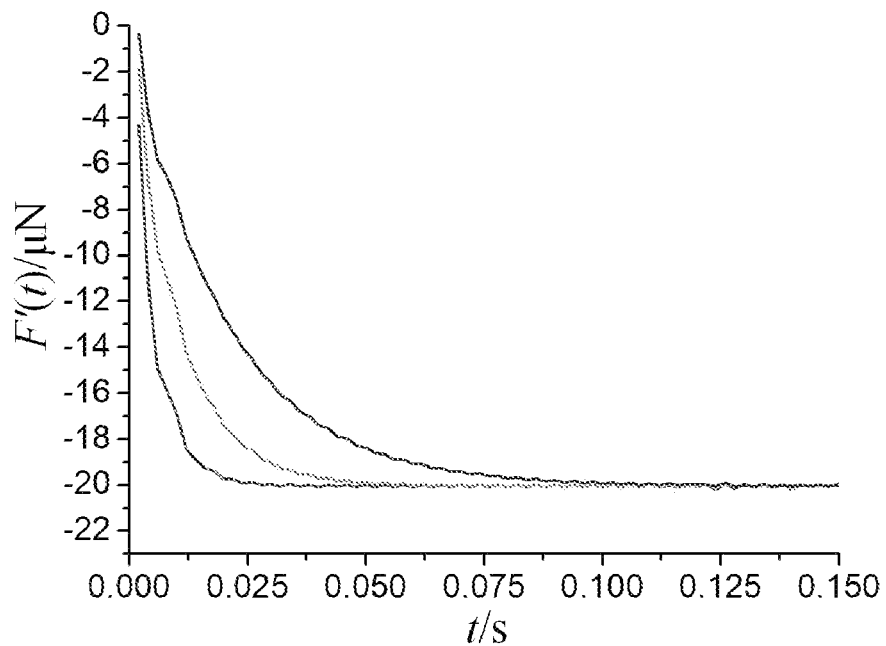
FIG. 11 is a graph of thrust inversely computed under the situation that thrust is gradually decreased.

As shown in FIG. 11, thrust inversely computed (computed by means of θ₁(t)) is shown. From FIG. 11, it is clearly confirmed that thrust decreasing time is 25 ms ↘ 50 ms ↘ 100 ms respectively.

Figure 12:
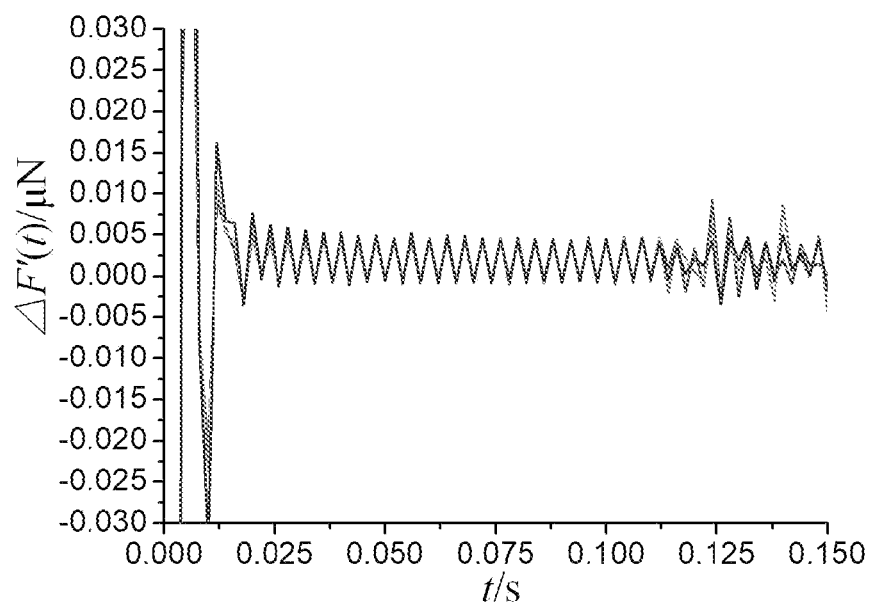
FIG. 12 is a graph of thrust errors inversely computed under the situation that thrust is gradually decreased.

As shown in FIG. 12, thrust errors inversely computed are shown. Under the above three situations, after 20 ms, a thrust error is less than 1%.

To sum up, the main technical features and advantages of the present disclosure are as follows:

(1) Aiming at a current situation that an internal relation between thrust response time and a system response of a thrust measurement system is not known at present, the present disclosure establishes a relation between thrust response time and time of entering a steady state of a thrust measurement system. Firstly, it is pointed out that during thrust response time measurement, thrust is varied from steady thrust, which means that initial conditions of the thrust measurement system are not zero. Secondly, the time of entering a steady state of the thrust measurement system is an inherent property of the thrust measurement system, the greater an inherent frequency of the thrust measurement system, the shorter the time of entering a steady state, and only under the situation that the thrust response time is longer than the time of entering a steady state of the thrust measurement system, the thrust response time may be determined and read from a system response curve. Finally, it is pointed out that a natural frequency of the thrust measurement system is required to be 100 Hz or above for measuring a thrust response time at a 10-ms level, which is difficult to realize by any (torsional pendulum, hanging pendulum, inverted pendulum, bending vibration) thrust measurement system in physical structure at present, such that another way should be explored.

(2) Aiming at a current situation that a dynamic thrust computation method for response time of rapid-varying thrust is immature and inaccurate, the present disclosure establishes an equivalent-sensitivity high-frequency thrust measurement system by connecting a digital filter in series on a thrust measurement system having a low natural frequency, and through a method for designing a digital filter, a natural frequency of the equivalent-sensitivity high-frequency thrust measurement system is greatly increased, time of entering a steady state is greatly shortened, and response time of rapid-varying thrust is measured. Firstly, thrust response time is determined and read according to a system response curve of an equivalent-sensitivity high-frequency thrust measurement system. Secondly, the thrust response time is confirmed by means of a thrust curve by inversely computing thrust, such that an evaluation conclusion of thrust response time is more accurate and reliable.

(3) Through the digital filter based method for measuring thrust response time of a satellite-borne micro-thruster, the natural frequency of the constructed equivalent-sensitivity high-frequency thrust measurement system is increased by 500 times to 1500 times, an adjustment range of a damping ratio is varied from 0.1-0.3 to 0.7-0.9, the time of entering a steady state is greatly shortened, and thrust response time at a 10-ms level is measured.

What is described above is merely specific implementations of the present disclosure, and is not intended to limit the present disclosure. Any modifications, equivalent replacements, improvements, etc. made within the spirit and principle of the present disclosure should all fall within the scope of protection of the present disclosure.

What is claimed is:

1. A digital filter based method for measuring thrust response time of a satellite-borne micro-thruster, comprising the following steps:
   S1: zeroing non-zero initial conditions of a thrust measurement system to obtain an oscillating differential equation for the thrust measurement system after variable substitution;
   S2: connecting the digital filter in series behind the thrust measurement system after variable substitution to obtain an equivalent-sensitivity high-frequency thrust measurement system;
   S3: determining a system response of the equivalent-sensitivity high-frequency thrust measurement system;
   S4: determining and reading thrust response time of the satellite-borne micro-thruster from the system response; and
   S5: inversely computing thrust to be measured by means of the equivalent-sensitivity high-frequency thrust measurement system.

2. The method for measuring thrust response time of the satellite-borne micro-thruster according to claim 1, wherein in the step S1, the system response $\theta(\tau)$ is measured by a displacement sensor under the action of the thrust f'(t) to be measured, variable substitution is carried out according to the non-zero initial conditions $(\theta_0, \dot{\theta}_0)$, and by making $$\theta(t)=\theta'(t)-\dot{\theta}_0 t-\theta_0,\ \dot{\theta}(t)=\dot{\theta}'(t)-\dot{\theta}_0\ \text{and}\ \ddot{\theta}(t)=\ddot{\theta}'(t),$$

the oscillating differential equation for the thrust measurement system after variable substitution is obtained:

$$\ddot{\theta}(t) + 2\zeta\omega_n\dot{\theta}(t) + \omega_n^2\theta(t) = \frac{L_f}{J}f(t)$$

$$f(t) = f'(t) + f_0(t)$$

$$f_0(t) = -\frac{J}{L_f}\left(2\zeta\omega_n\dot{\theta}_0 + \omega_n^2\dot{\theta}_0 t + \omega_n^2\theta_0\right)$$

wherein $f_0(t)$ represents equivalent thrust related to the non-zero initial conditions, f'(t) represents the thrust to be measured, $\theta'(t)$ represents the system response measured by the displacement sensor under the action of the thrust, $\zeta$ represents a damping ratio, $\omega_n$ represents a natural vibration frequency, J represents moment of inertia, $L_f$ represents a moment arm, $\theta_0$ represents an initial torsion angle, $\theta_0$ and $\theta_0$ and $\dot{\theta}_0$ and are constants, $\theta(t)$ represents the system response after variable substitution, and initial conditions $\theta(0)=0$ and $\dot{\theta}(0)=0$ are satisfied.

3. The method for measuring thrust response time of the satellite-borne micro-thruster according to claim 2, wherein the thrust response time comprises thrust increasing time and thrust decreasing time.

4. The method for measuring thrust response time of the satellite-borne micro-thruster according to claim 1, wherein in the step S2, a transfer function of the digital filter is, $$D(s) = \frac{\omega_{n1}^2}{\omega_n^2}\left[1 - 2(\zeta_1\omega_{n1} - \zeta\omega_n)\frac{s + \zeta_1\omega_{n1}}{(s + \zeta_1\omega_{n1})^2 + \omega_{d1}^2}\right) - \frac{(\omega_{n1}^2 - \omega_n^2) - 2(\zeta_1\omega_{n1} - \zeta\omega_n)\zeta_1\omega_{n1}}{\omega_{d1}} \cdot \frac{\omega_{d1}}{(s + \zeta_1\omega_{n1})^2 + \omega_{d1}^2}\right]$$

s represents the complex parameter variable, and, a unit impulse response function of the digital filter is, $$d(t) = C_\omega^2\left[\delta(t) - 2(\zeta_1 C_\omega - \zeta)\omega_n e^{-\zeta_1 C_\omega \omega_n t}\cos\left(\sqrt{1-\zeta_1^2}\ C_\omega\omega_n t\right) - \frac{(C_\omega^2-1) - 2(\zeta_1 C_\omega - \zeta)\zeta_1 C_\omega}{\sqrt{1-\zeta_1^2}\ C_\omega}\omega_n e^{-\zeta_1 C_\omega\omega_n t}\sin\left(\sqrt{1-\zeta_1^2}\ C_\omega\omega_n t\right)\right]$$

wherein $\omega_n$ represents the natural vibration frequency, $\zeta$ represents the damping ratio, $\omega_{n1}$ represents a natural frequency of the equivalent-sensitivity high-frequency thrust measurement system, $\omega_{n1}=C_\omega\omega_n$, $C_\omega$ represents a frequency ratio, $\zeta_1$ represents a damping ratio of the equivalent-sensitivity high-frequency thrust measurement system, and $\omega_{d1}=\sqrt{1-\zeta_1^2}\omega_{n1}$ represents an improved vibration frequency.

5. The method for measuring thrust response time of athe satellite-borne micro-thruster according to claim 3, wherein $C_\omega>1$.

6. The method for measuring thrust response time of the satellite-borne micro-thruster according to claim 5, wherein the thrust response time comprises thrust increasing time and thrust decreasing time.

7. The method for measuring thrust response time of the satellite-borne micro-thruster according to claim 4, wherein $\zeta_1=0.7\sim0.9$.

8. The method for measuring thrust response time of the satellite-borne micro-thruster according to claim 7, wherein the thrust response time comprises thrust increasing time and thrust decreasing time.

9. The method for measuring thrust response time of the satellite-borne micro-thruster according to claim 4, wherein the thrust response time comprises thrust increasing time and thrust decreasing time.

10. The method for measuring thrust response time of the satellite-borne micro-thruster according to claim 1, wherein in the step S3, input of the digital filter is $\theta(\tau)$, $\theta(\tau)$ is computed according to a measured value $\theta(\tau)$ of a displacement sensor, and the system response $\theta(\tau)$ output by the digital filter is computed $\theta_1(t)=\int_0^t\theta(\tau)d(t-\tau)d\tau$, wherein $\tau$ is an integral variable, the displacement sensor is used for obtaining the system responses of the thrust measurement system.

11. The method for measuring thrust response time of the satellite-borne micro-thruster according to claim 10, wherein the thrust response time comprises thrust increasing time and thrust decreasing time.

12. The method for measuring thrust response time of the satellite-borne micro-thruster according to claim 1, wherein in the step S4, under the situation that the system response is 1% greater than or less than a steady-state system response, the corresponding time is the thrust response time determined and read in S4.

13. The method for measuring thrust response time of the satellite-borne micro-thruster according to claim 12, wherein the thrust response time comprises thrust increasing time and thrust decreasing time.

14. The method for measuring thrust response time of the satellite-borne micro-thruster according to claim 1, wherein in the step S5, a unit impulse response function $h_1(t)$ of the equivalent-sensitivity high-frequency thrust measurement system is, $$h_1(t) = \frac{\omega_{n1}^2 L_f}{k\omega_{d1}} e^{-\zeta_1 \omega_{n1} t} \sin(\omega_{d1} t)$$

$\omega_{n1}$ represents a natural frequency of the equivalent-sensitivity high-frequency thrust measurement system;

$\omega_{d1}$ represents an improved vibration frequency;

$\zeta_1$ represents a damping ratio of the equivalent-sensitivity high-frequency thrust measurement system;

$L_f$ represents a moment arm;

k represents a torsional stiffness coefficient;

what is known is that output of the digital filter is θ(t), and nominal thrust f(τ) is computed by means of an integral thrust equation for the equivalent-sensitivity high-frequency thrust measurement system: $\theta_1(t) = \int_0^t f(\tau) h_1(t-\tau) d\tau$.

15. The method for measuring thrust response time of athe satellite- borne micro-thruster according to claim 14, wherein an estimated value F' (t) of the thrust f' (t) to be measured is: F'(t)=F(t)−f(t)−f$_0$(t), wherein $$f_0(t) = -\frac{J}{L_f}\left(2\zeta\omega_n \dot{\theta}_0 + \omega_n^2 \dot{\theta}_0 t + \omega_n^2 \theta_0\right),$$

f$_0$(t) represents an equivalent thrust related to the non-zero initial conditions, F(t) represents an estimated value of the nominal thrust f(t), ζ represents a damping ratio, $\omega_n$ represents a natural vibration frequency, J represents moment of inertia, $L_f$ represents a moment arm, $\theta_0$ represents an initial torsion angle, and $\theta_0$ and $\dot{\theta}_0$ are constants.

16. The method for measuring thrust response time of the satellite-borne micro-thruster according to claim 15, wherein the thrust response time comprises thrust increasing time and thrust decreasing time.

17. The method for measuring thrust response time of the satellite-borne micro-thruster according to claim 14, wherein the thrust response time comprises thrust increasing time and thrust decreasing time.

18. The method for measuring thrust response time of the satellite-borne micro-thruster according to claim 1, wherein the thrust response time comprises thrust increasing time and thrust decreasing time.

\* \* \* \* \*